(12) United States Patent
Matsuda et al.

(10) Patent No.: US 10,925,210 B2
(45) Date of Patent: Feb. 23, 2021

(54) WORK VEHICLE FOR MANAGING A LAWN BASED ON LAWN ACTIVITY

(71) Applicant: Kubota Corporation, Osaka (JP)

(72) Inventors: Kazuaki Matsuda, Sakai (JP); Katsuhiko Uemura, Sakai (JP)

(73) Assignee: Kubota Corporation, Osaka (JP)

( * ) Notice: Subject to any disclaimer, the term of this patent is extended or adjusted under 35 U.S.C. 154(b) by 323 days.

(21) Appl. No.: 16/001,995

(22) Filed: Jun. 7, 2018

(65) Prior Publication Data

US 2019/0141887 A1    May 16, 2019

(30) Foreign Application Priority Data

Nov. 16, 2017 (JP) .............................. JP2017-220855

(51) Int. Cl.
| | | |
|---|---|---|
| *A01D 34/00* | (2006.01) | |
| *A01D 34/66* | (2006.01) | |
| *A01D 43/00* | (2006.01) | |
| *G06T 7/00* | (2017.01) | |
| *A01D 101/00* | (2006.01) | |
| *H04N 5/33* | (2006.01) | |

(52) U.S. Cl.
CPC ............ *A01D 34/006* (2013.01); *A01D 34/66* (2013.01); *A01D 43/00* (2013.01); *G06T 7/0002* (2013.01); *A01D 2101/00* (2013.01); *G06T 2207/30188* (2013.01); *H04N 5/33* (2013.01)

(58) Field of Classification Search
CPC ... A01D 34/006; A01D 34/008; G06T 7/0002
See application file for complete search history.

(56) References Cited

U.S. PATENT DOCUMENTS

| | | | |
|---|---|---|---|
| 8,634,960 B2 * | 1/2014 | Sandin | B60L 3/0023 |
| | | | 700/258 |
| 2013/0047565 A1 | 2/2013 | Shida et al. | |
| 2014/0075902 A1 | 3/2014 | Shida et al. | |
| 2014/0325949 A1 | 11/2014 | Shida et al. | |
| 2015/0282424 A1 | 10/2015 | Shida et al. | |
| 2017/0303466 A1* | 10/2017 | Grufman | H04N 7/185 |

FOREIGN PATENT DOCUMENTS

| | | |
|---|---|---|
| JP | 61139304 A | 6/1986 |
| JP | H1048054 A | 2/1998 |
| JP | 2011142844 A | 7/2011 |
| JP | 2012235712 A | 12/2012 |
| JP | 201442490 A | 3/2014 |
| JP | 201610398 A | 1/2016 |
| JP | 5902120 B2 | 4/2016 |
| JP | 6059027 B | 1/2017 |
| WO | 2011086745 A1 | 7/2011 |
| WO | 2015186355 A1 | 12/2015 |
| WO | 2017131172 A1 | 8/2017 |

* cited by examiner

*Primary Examiner* — Alicia Torres
(74) *Attorney, Agent, or Firm* — The Webb Law Firm

(57) ABSTRACT

A work vehicle for managing lawn while traveling includes a positioning module for outputting positioning data, a self-vehicle position calculation section for calculating a self-vehicle position based on the positioning data, an activity determination device for determining activity of the lawn, and a lawn condition information generation section configured to generate lawn condition information by correlating the activity with the self-vehicle position as a determination point of the activity.

8 Claims, 3 Drawing Sheets

WORK VEHICLE FOR MANAGING A LAWN BASED ON LAWN ACTIVITY

CROSS-REFERENCE TO RELATED APPLICATION

This application claims priority to Japanese Patent Application No. 2017-220855 filed Nov. 16, 2017, the disclosure of which is hereby incorporated in its entirety by reference.

BACKGROUND OF THE INVENTION

Field of the Invention

The present invention relates to a work vehicle for managing lawn while traveling.

Description of Related Art

As a work vehicle configured to check a condition of lawn while traveling, e.g. Japanese Unexamined Patent Application Publication No. Sho. 61-139304 discloses a lawn mower configured to detect a borderline between a cut (treated) land and an uncut (un-treated) land based on a photographic image obtained from a camera for photographing view forwardly of traveling direction. The technique disclosed in this document focuses on a fact that brightness difference exists between lawn before cutting and lawn after cutting. More specifically, the technique detects a portion having distinct brightness difference in a photographed image as a borderline between a cut land and an uncut land. The detected borderline is used as a target for automated traveling of the vehicle.

Further, a work vehicle disclosed in Japanese Unexamined Patent Application Publication No. 2014-42490 is provided with a camera for photographing a lawn surface area present in its traveling direction. And, a portion (called a "depot") where the lawn is shaved and exposed is detected from a photographed image of the camera. Further, at a rearmost portion of this work vehicle, there is mounted a depot repairing machine for discharging sand. A detected depot will be "sanded up" by the depot repairing machine.

In the work vehicles disclosed in JP No. 61-139304 and JP No. 2014-42490, the vehicles utilize a photographed image acquired by a camera for detection of a lawn surface condition. However, these documents fail to disclose any technique for detecting growth condition of lawn per se based on such photographed image. The most important factor for lawn land management is a growth condition of lawn. Yet, in the conventional techniques, determination of lawn growth condition is left up to an experienced lawn manager person. Further, for a large lawn land, there has been an attempt to determine lawn activity (NDVI value: Normalized Difference Vegetation Index) based on aerial photographs obtained by using a drone or the like. However, this method imposes heavy cost burden and suffers also a problem of difficulty of determination on a partial area. Incidentally, the NDVI value is an index indicative of a distribution situation or activity of vegetation.

In view of the above-described state of the above, there is a need for a work vehicle that can determine lawn activity easily and can contribute to effective lawn management.

SUMMARY OF THE INVENTION

According to the present invention, a work vehicle for managing lawn while traveling comprises:

a positioning module for outputting positioning data;

a self-vehicle position calculation section for calculating a self-vehicle position based on the positioning data;

an activity determination device for determining activity of the lawn; and a lawn condition information generation section configured to generate lawn condition information by correlating the activity with the self-vehicle position as a determination point of the activity.

With the above-described arrangement, activity of lawn can be determined by the activity determination device while the vehicle is traveling. Then, obtained activity will be correlated with the self-vehicle position indicative of its determination point as lawn condition information. In this way, as activity determinations are effected by a predetermined interval while traveling, it is possible to generate activity distribution along the traveling route from the lawn condition information. With production of such activity distribution, the growth condition of lawn will become easily recognizable. Thus, an area which suffers poor growth locally can be easily spotted. And, by causing the result of activity determinations to be reflected in a plan for a lawn management work to be done next, lawn management will be improved.

In case the driver is a lawn managing person, if it is arranged such that lawn condition information which is the result of activity determinations is reported in the course of vehicle traveling, the lawn managing person can make real-time comparison between a growth condition of lawn visually recognized and the growth condition as the result of determinations advantageously. In this case, more preferably, the lawn condition information is not reported directly, but lawn evaluation information obtained by evaluating the lawn condition information is reported instead. In particular, it will be even more advantageous if the lawn evaluation information is reported in a form readily recognizable by the lawn managing person, e.g. in a map form, a list form, etc. For this reason, according to one preferred embodiment of the present invention, there is provided a reporting device (a speaker, a display, etc.) for reporting the lawn condition information or lawn evaluation information obtained by evaluating the lawn condition information by e.g. a statistical technique.

For determination of a lawn growth condition in a small section while traveling, a determination device having good resolution and speedy determination ability is required. Therefore, as the determination device, a chlorophyll meter can be used advantageously. A chlorophyll meter is capable of instantaneously determining a nutrition absorption degree of lawn per 5-10 $cm^2$ area with using a light beam. The chlorophyll meter allows also calculation of an NDVI value or a reflectance by irradiating a light beam having a red to infrared band to lawn and calculating such NDVI value or reflectance from a reflection wavelength of the beam reflected from the lawn. For this reason, according to one preferred embodiment of the present invention, the determination device comprises a chlorophyll meter which is configured to calculate and output an NDVI value as the activity from reflection wavelength of light beam having a red to infrared band.

In case the lawn evaluation information is produced by statistical evaluation of the lawn condition information, it is preferred that the lawn condition information include not only the NDVI value or the reflectance, but also data relating to various environmental factors and/or date and time. More preferably, the lawn condition information can comprise result of image processing obtained by image processing of the camera-captured photographic image. And, the lawn condition information comprised of such data as above can be handled as "big data". And, by utilizing big data processing technique, more accurate lawn evaluation information can be produced. For this reason, according to one preferred embodiment of the present invention, the work vehicle further comprises a temperature determination device for determining a surface temperature and an ambient temperature of the lawn and a camera for photographing the lawn; wherein the lawn condition information includes at least one of determination result of the temperature determination device, a photographic image captured by the camera, and a result of image processing effected on the photographic image.

In lawn management, a lawn cutting (mowing) work is important. Thus, such cutting work is done frequently. For this reason, preferably, the above-described work vehicle having the activity determination device and the positioning module is configured to function as a lawn mower. On a lawn grown surface cut by the lawn mower, a lot of cut lawn clippings will be accumulated thereon. So, preferably, the activity determination is done on lawn before cutting. Further, in case the camera is used for checking a surface condition of cut trace, the photographing range of the camera should be lawn of the cut trace. For this reason, according to one preferred embodiment of the present invention, the work vehicle further comprises a mower deck having a cutter blade for cutting the lawn, and the activity determination device is disposed forwardly of the mower deck in a work traveling direction and the camera is disposed rearwardly of the mower deck in the work traveling direction. With this work vehicle, while the vehicle is traveling while cutting the lawn, determination of activity of lawn before cutting and checking of lawn condition of lawn after cutting are made possible.

In the case of a work vehicle having the function of checking lawn condition after cutting based on camera captured image, it will be advantageous if this work vehicle further comprises an image processing section capable of synthesizing the photographic image based on a traveling route and producing cut lawn surface image for confirmation of the lawn condition. With this arrangement, comprehensive observation of the entire area in which the vehicle has effected cutting traveling becomes possible.

The photographic image of the camera includes wide-band reflection beam information. Therefore, lawn activity determination is possible by image-processing the photographic image also. In this case, the combination of the camera and the image processing serves as the "activity determination device".

If the lawn condition information has a large data amount, a high calculation ability will be required for a lawn evaluation section. Further, a high calculation ability will be required for a lawn evaluation section, also in case the lawn evaluation information is produced based on past lawn condition information or lawn condition information of other lawn land. Thus, preferably, the lawn evaluation section is built not in a control system of the work vehicle, but in a management computer installed in e.g. a management center. For this reason, according to one preferred embodiment of the present invention, a lawn evaluation section configured to input the lawn condition information and to output lawn evaluation a condition of lawn is built in a management computer that provides a cloud service.

Further, in case a same managing person carries out lawn management with using a plurality of work vehicles, preferably, the lawn evaluation section is built in a mobile communication terminal such as a tablet computer owned by this managing person. Needless to say, if a mobile communication terminal is incorporated in a control system of the work vehicle, the lawn evaluation section can be built in this mobile communication terminal also.

DETAILED DESCRIPTION OF THE PREFERRED EMBODIMENTS

In this description, unless indicated otherwise, a word "front" means front (side) in relation to a vehicle body front-rear direction (traveling direction), and a word "rear" means rear (side) in relation to the vehicle body front-rear direction (traveling direction). Further, a right-left direction or a transverse direction means a vehicle body transverse direction (vehicle body width direction) perpendicular to the vehicle body front-rear direction. A word "upper" or a word "lower" means positional relationship with respect to the perpendicular (vertical) direction of the vehicle body, referring to relationship in the ground surface clearance height.

Figure 1:
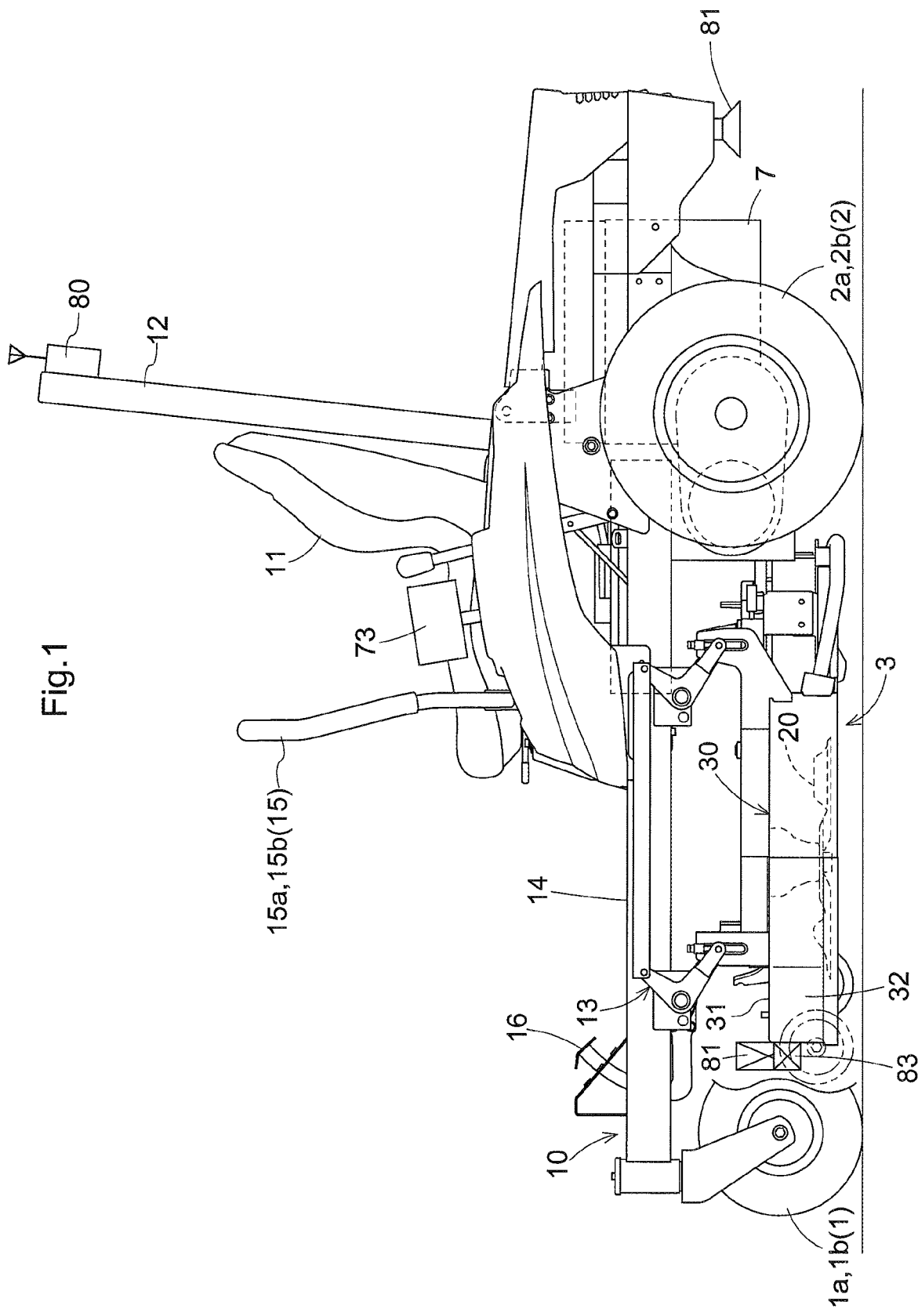
FIG. 1 is a side view of a riding electric powered lawn mower as an example of a work vehicle relating to the present invention.
Figure 2:
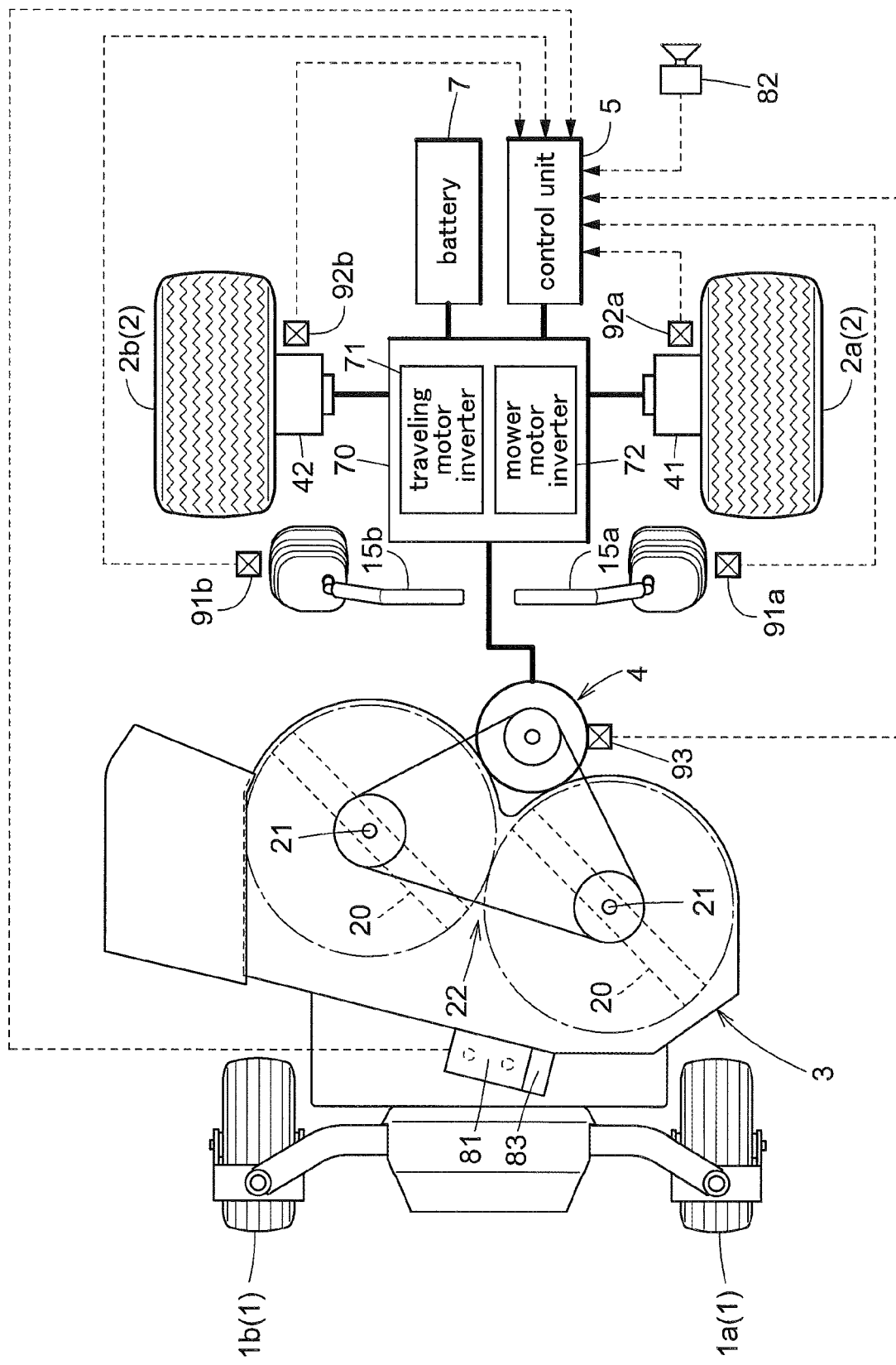
FIG. 2 is a schematic diagram showing a power system and a control system of the lawn mower.

Next, with reference to the accompanying drawings, one specific embodiment of a work vehicle according to the present invention will be explained. FIG. 1 is a side view of a riding electric powered lawn mower (to be referred to simply as a "lawn mower" hereinafter) as an example of a work vehicle relating to the present invention. FIG. 2 is a schematic diagram showing a power system and a control system of the lawn mower. This lawn mower includes a vehicle body frame 10 supported by a front wheel unit 1 consisting of a caster type left front wheel 1*a* and a caster type right front wheel 1*b* which are freely rotatable and a rear wheel unit 2 consisting of a left rear wheel 2*a* and a right rear wheel 2*b*, a battery 7 disposed at a rear portion of the vehicle body frame 10, a driver's seat 11 disposed forwardly of the battery 7, a ROPS frame 12 vertically mounted from a rear side of the driver's seat 11, and a mower unit 3 mounted between the front wheel unit 1 and the rear wheel unit 2 in a space under the vehicle body frame 10 and suspended from the vehicle body frame 12 to be liftable up/down via a lift link mechanism 13. At the top of the ROPS frame 12, there is attached a positioning module 80 including an antenna for receiving satellite radio wave.

Forwardly of the driver's seat 11, there is provided a floor plate 14 acting as a footrest for the driver. And, from this floor plate 14, a brake pedal 16 protrudes. On opposed sides of the driver's seat 11, there is mounted a maneuvering unit 15 consisting of a left maneuvering lever 15*a* and a right maneuvering lever 15*b*. The left maneuvering lever 15*a* and the right maneuvering lever 15*b* are both pivotable about a horizontal pivot axis extending in the vehicle body transverse direction. A rotational speed of the left rear wheel 2*a* can be changed by the left maneuvering lever 15*a*. Also, a rotational speed of the right rear wheel 2*b* can be changed by the right maneuvering lever 15*b*. Thus, the rotational speed of the left rear wheel 2*a* and the rotational speed of the right rear wheel 2*b* can be changed independently of each other. Further, by reversing the respective rotational directions from each other, a sharp (spin) turn is made possible. On one side of the driver's seat 11, there is provided a reporting device 73 for reporting various kinds of information to the driver. The reporting device 73 includes a display for reporting visual message to the driver and/or a speaker for reporting audio (or voice) message to the driver.

The mower unit 3 includes a mower deck 30 and two rotary cutter blades 20. The cutter blade 20 on the left side and the cutter blade 20 on the right side are disposed side by side in the vehicle body transverse direction. The mower deck 30 includes a top wall 31 and a side wall 32 extending downward from an outer circumferential edge of the top wall 31. Each cutter blade 20 is disposed in an inner space of the mower deck 30 formed by the top wall 31 and the side wall 32.

In the side wall 32, at a portion thereof on the front side in the work traveling direction, there is provided a chlorophyll meter 81 for lawn as an "activity determination device" for detecting lawn condition. This chlorophyll meter 81 is disposed forwardly of the mower deck 30. Further, this chlorophyll meter 81 irradiates a light beam having a band from 660 nm to 850 nm (a red band to an infrared band) onto lawn and effects spectral analysis (analysis of wavelength of reflection light) on reflection light reflected from the lawn and then outputs a NDVI (Normalized Difference Vegetation Index) value or a reflectance (%) as a determination result. From this outputted value, the activity (vegetation activity) can be calculated. In the same housing as the chlorophyll meter 81 or in a housing of its own, a temperature determination device 83 is provided. This temperature determination device 83 can output a surface temperature and an ambient temperature (environment temperature) of lawn as a determination result.

Rearwardly of the mower deck 30 in the work traveling direction, there is mounted a camera 82 for photographing a state of lawn surface cut by the mower unit 3. In this embodiment, the camera 82 is provided at the rear end of the vehicle body frame 10. As a photographed image of the camera 82 is shown on the display, the driver can check the cut condition immediately. Further, by synthesizing photographed images obtained over time, observation of lawn of cut trace for a wide area becomes also possible.

FIG. 2 shows a power system and a control system of the lawn mower. A mower motor 4 for feeding power to a rotational shaft 21 on which the cutter blades 20 are mounted is mounted on the mower deck 30. For power transmission from the mower motor 4 to the rotational shaft 21, a belt transmission mechanism 22 is employed. For rotating the left rear wheel 2*a*, a left motor 41 is provided. For rotating the right rear wheel 2*b*, a right motor 42 is provided. In the instant embodiment, the left motor 41 and the right motor 42 which are driven independently of each other together constitute a "traveling motor".

The left motor 41, the right motor 42 and the mower motor 4 receive supply of power from an inverter 70. This inverter 70 includes a traveling motor inverter 71 for supplying power to the left motor 41 and the right motor 42, and a mower motor inverter 72 for supplying power to the mower motor 4. The inverter 70 drives the motors based on control signals from a control unit 5. The inverter 70 is connected to a battery 70 as a power source.

Figure 3:
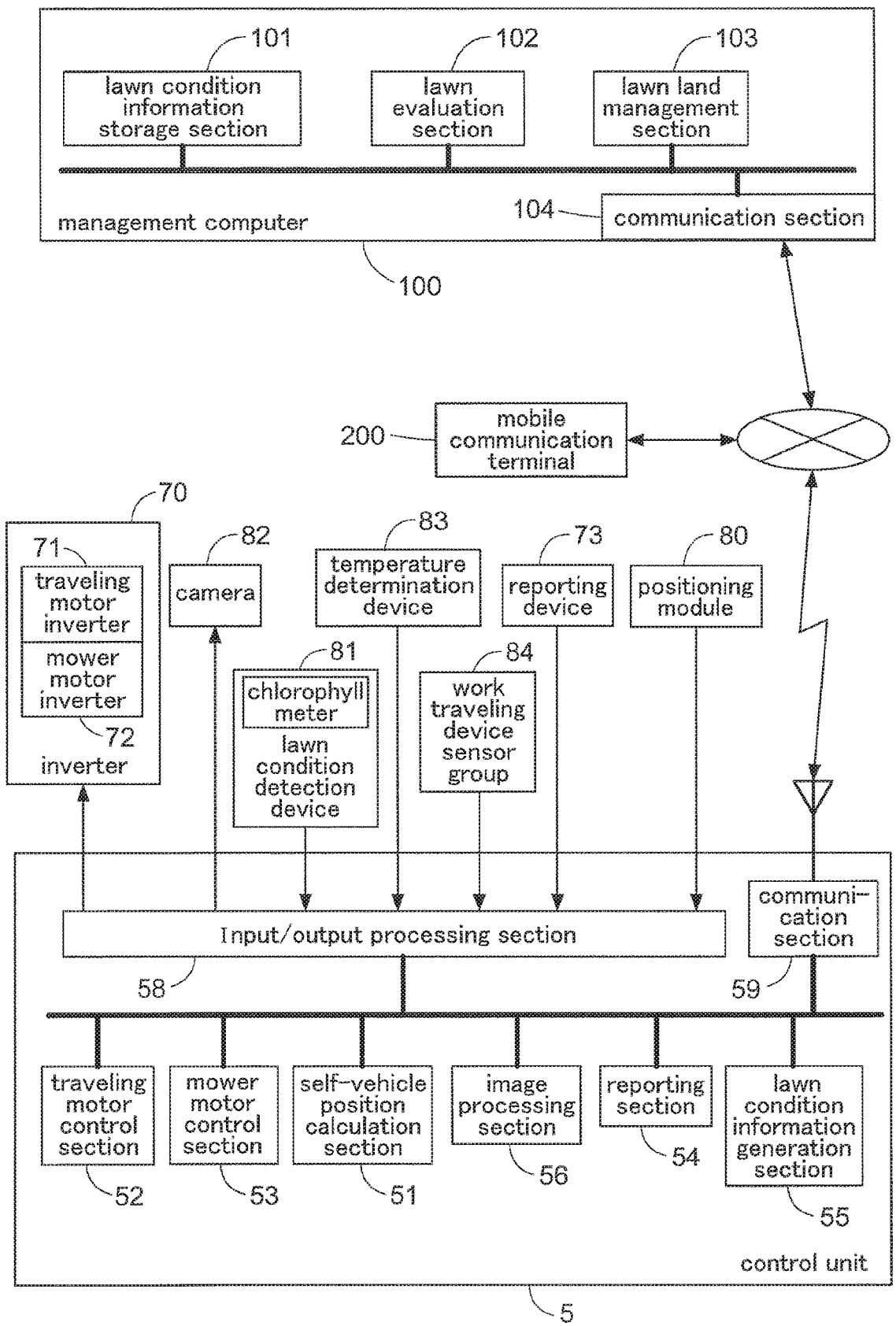
FIG. 3 is a functional block diagram of the control system.

FIG. 3 shows a control system built in the above-described lawn mower and a function section constituting a lawn management cloud service in a management computer 100. This management computer 100 is installed at a management center remote from a work site. Incidentally, in case the lawn management is of a small scale, the function section built in the management computer 100 will be built in a mobile communication terminal 200 capable of data communication, which actually is a personal computer or a tablet computer owned or carried by a user.

The control unit 5 is a core component of the control system of the lawn mower. The control unit 5 includes an input/output processing section 58 and a communication section 59. The input/output processing section 58 functions as an input/output interface. The communication section 59 is a wireless communication device for data communication with a communication section 104 of the management computer 100 and the mobile communication terminal 200. Incidentally, the communication section 59 has also a near-field wireless communication function, so it can effect wireless data communication with a mobile phone owned by the driver. Therefore, via this mobile phone, data communication is also possible between the control unit 5 of the lawn mower or the mobile communication terminal 200 or the management computer 100.

To the input/output processing section 38, there are connected the inverter 70, the reporting device 73, the positioning module 80, the chlorophyll meter 81, the camera 82, the temperature determination device 83, a work traveling device sensor group 84, etc. The inverter 70 consists of the traveling motor inverter 71 and the mower motor inverter 72. The work traveling device sensor group 84, as shown in FIG. 2, includes a left steering angle detection sensor 91*a*, a right steering angle detection sensor 91*b*, a left motor rotation detection sensor 92*a*, a right motor rotation detection sensor 92*b*, and a mower motor rotation detection sensor 93.

The control unit 5 includes a self-vehicle position calculation section 51, a traveling motor control section 52, a mower motor control section 53, a reporting section 54, a lawn condition information generation section 55, an image processing section 56, and so on.

The self-vehicle position calculation section 51 calculates a self-vehicle position based on positioning data from the positioning module 80 using the GPS, or the like. In the instant embodiment, the self-position calculation section 51 includes map data. Therefore, as the "self-vehicle position", not only longitude and latitude data, but also e.g. an address of a work site, etc. will be outputted. Further, since the positioning data includes day and time, based on an address of the work site and day and time of work and with using e.g. a web service, it is possible to acquire a weather at the time of work as well.

The traveling motor control section 52 has a left wheel speed calculation function, a right wheel speed calculation function, and a control signal generation function. The left steering angle detection sensor 91*a* detects an operational amount of the left maneuvering lever 15*a* by the driver. The left wheel speed calculation function calculates a rotational speed of the left rear wheel 2*a* based on a detection signal from the left steering angle detection sensor 91*a*. The rotational speed of the left rear wheel 2*a* corresponds to a rotational speed of the left motor 41. Namely, the left wheel speed calculation function calculates a rotational speed of the left motor 41. The right steering angle detection sensor 91*b* detects an operational amount of the right maneuvering lever 15*b* by the driver. The right wheel speed calculation function calculates a rotational speed of the right rear wheel 2*b* based on a detection signal from the right steering angle detection sensor 91*b*. The rotational speed of the right rear wheel 2*b* corresponds to a rotational speed of the right motor 42. Namely, the right wheel speed calculation function calculates a rotational speed of the right motor 42. The control signal generation function generates control signals for providing the left motor 41 and the right motor 42 with electric power necessary for realizing the calculated rotational speed of the left motor 41 and the calculated rotational speed of the right motor 42 respectively and provides these control signals to the traveling motor inverter 71. The traveling motor inverter 71 supplies the powers to the left motor 41 and the right motor 42 independently of each other. With this, rotational speeds of the left rear wheel 2a and the right rear wheel 2b can be made different from each other. And, as a resultant speed difference between the left and right rear wheels, a turn of the lawn mower will be effected.

The mower motor control section 53 drives the mower motor 4 by controlling the mower motor inverter 72. The mower motor control section 53 can determine hardness of lawn, based on the activity obtained from the chlorophyll meter 81. And, it may be arranged also such that with higher the torque, the mower motor control section 53 rotates the cutter blades 20, the higher the determined hardness.

The lawn condition information generation section 55 generates lawn condition information by correlating the activity (NDVI value) and the reflectance obtained from the chlorophyll meter 81 and the surface temperature and the ambient temperature of lawn obtained from the temperature determination device 83 with the self-vehicle position and day and time. Since the determination point of the chlorophyll meter 81 can be determined from a self-vehicle position, lawn condition information at an accurate position on a map can be produced.

The image processing section 56 effects an image processing on photographic images obtained by the camera 82 to generate image data useful for lawn management. For instance, it is possible to generate an image relating to growth of lawn leaves by e.g. chromaticity filter processing and to add this to the lawn condition information. Moreover, it is also possible to synthesize a photographic image of lawn surface acquired by a predetermined unit distance traveling and to show the entire or a part of the cut area of lawn land on the display. The image processing section 56 may be provided with not only the function of generating lawn cut image for confirmation of lawn condition, but also a function of determining e.g. the kind of lawn from the photographic image.

The lawn condition information generated by the lawn condition information generation section 55 is uploaded to the management computer 100. In this management computer 100, there are built in a lawn condition information storage section 101, a lawn evaluation section 102 and a lawn land management section 103.

In the lawn land management section 103, there are registered property data of lawn lands managed by this management computer 100. Here, "property data of lawn land" means e.g. a location, an owner, kind of lawn, management history, etc. The lawn condition information storage section 101 stores the lawn condition information uploaded from the lawn mower sorted according to respective lawn lands and in chronological order.

The lawn condition information stored in the lawn condition information storage section 101 are inputted to the lawn evaluation section 102. And, this lawn evaluation section 102 outputs lawn health condition information and advisory information for lawn management as lawn evaluation information. In the lawn condition information, such data as the activity (NDVI value), reflectance, surface temperature and/or ambient temperature of lawn, date and time, etc. are correlated with the self-vehicle position. Therefore, the lawn evaluation section 102 can generate lawn evaluation information of each map position (for each predetermined section), e.g. activity distribution. Further, activity distribution along traveling path can also be shown on the display of the lawn mower. Moreover, the lawn condition information storage section 101 stores also a vast amount of lawn condition information chronologically. Then, by using such vast lawn condition information as "big data" and by implementing a statistical calculation technique, present health condition of lawn, future fertilization plan, cutting plan (cutting height, a cutting timing, etc.) etc. can be outputted as the lawn evaluation information. Moreover, based on a photographic image of cut trace obtained by the camera 82 or reflectance obtained by the chlorophyll meter 81, etc., it is also possible to evaluate "neatness" of lawn of a predetermined section of lawn land or the entire lawn land.

The lawn evaluation information outputted substantially in real time from the lawn evaluation section 102 is sent to the reporting section 54 of the lawn mower and then reported via the reporting device 73 to the driver. The lawn condition information generated by the lawn evaluation section 102 is stored in the lawn land management section 103. Therefore, a user can make an access to the management computer 100 via hits/her mobile communication terminal 200 and download a desired lawn condition information therefrom.

With the generation of the lawn condition information and lawn evaluation information described above, following advantages can be obtained.

(1) If many individual users that manage lawn or a business entity user managing lawn utilize(s) the management computer 100, lawn management for wide area is made possible.

(2) For a user lacking knowledge about lawn management, with reporting of lawn health condition or fertilization timing, lawn management is facilitated.

(3) Epidemic spreading of disease of lawn can be discovered early and timely. So preventive measure against the disease can be taken appropriately.

(4) By effecting torque control (current control) of the mower motor 4 in accordance with the activity, quality improvement of cut product and energy saving can be realized.

(5) Through analysis of lawn condition information as many application examples, performance of the lawn mower can be improved.

Other Embodiments (1) In the foregoing embodiment, as a work vehicle, an electric powered lawn mower was cited. However, the present invention is applicable also to a lawn mower having an internal combustion engine.

(2) The functions which were built in the management computer 100 in the foregoing embodiment can be built in the control system of the lawn mower, instead. Further alternatively, those functions relating to generation of lawn condition information and lawn evaluation information can be built in the mobile communication terminal 200 such as a tablet type computer connectable to this control system.

(3) In the foregoing embodiment, as the activity determination device for determining activity of lawn, the chlorophyll meter 81 was employed. However, any other determination device can be used also. For instance, it is possible to employ a device configured to determine activity of lawn by effecting image processing on a photographic image acquired by the camera. In this case, the camera for use in the activity calculation also can be the same camera 82 used for photographing the lawn cut condition.

(4) In the foregoing embodiment, as the work vehicle for managing lawn while traveling, a lawn mower was cited. However, the present invention is applicable also to other lawn managing machine such as a lawn fertilizing machine, a water sprinkling machine, etc.

Incidentally, the arrangement(s) disclosed in the foregoing embodiment (including the further embodiments) can be used in any combination with the arrangement(s) disclosed in other embodiments, unless contradiction occurs. Further, the embodiments disclosed in the above description are only exemplary. The present invention is not limited thereto, but may be modified as needed or desired within a range not departing from the essence of the present invention.

The invention claimed is:

1. A work vehicle for managing a lawn while traveling comprising:
   a chlorophyll meter configured to calculate and output a normalized difference vegetation index (NDVI) value based on a reflection wavelength of a light beam having a red to infrared band irradiated from the chlorophyll meter; and
   one or more processors programmed and/or configured to:
      receive positioning data;
      calculate a self-vehicle position based on the positioning data;
      generate lawn condition information by correlating the NDVI value with the self-vehicle position as a determination point of the NDVI value; and
      control a torque of a mower motor of the work vehicle according to the lawn condition information.

2. The work vehicle of claim 1, further comprising:
   at least one of a speaker and a display configured to report the lawn condition information.

3. The work vehicle of claim 1, further comprising:
   a temperature determination device for determining a surface temperature and an ambient temperature of the lawn; and
   a camera for photographing the lawn;
   wherein the lawn condition information includes at least one of a determination result of the temperature determination device, a photographic image captured by the camera, and a result of image processing effected on the photographic image.

4. The work vehicle of claim 3, further comprising:
   a mower deck having a cutter blade for cutting the lawn, the cutter blade driven by the mower motor,
   wherein the chlorophyll meter is disposed forwardly of the mower deck in a work traveling direction and the camera is disposed rearwardly of the mower deck in the work traveling direction.

5. The work vehicle of claim 3, wherein the one or more processors are further programmed and/or configured to synthesize the photographic image based on a traveling route and produce a cut lawn surface image for confirmation of a lawn condition.

6. The work vehicle of claim 1, further comprising:
   a camera configured to photograph the lawn,
   wherein the one or more processors are further programmed and/or configured to generate the lawn condition information from a photographic image obtained by the camera.

7. A system comprising:
   the work vehicle of claim 1; and
   a management computer providing a cloud service, wherein the management computer is programmed and/or configured to input the lawn condition information, evaluate the lawn condition information using a statistical technique to obtain lawn evaluation information, and to output the lawn evaluation information evaluating a condition of the lawn.

8. A system comprising:
   the work vehicle of claim 1; and
   a mobile communication terminal configured to be carried into the work vehicle, wherein the mobile communication terminal is configured to input the lawn condition information, evaluate the lawn condition information using a statistical technique to obtain lawn evaluation information, and to output the lawn evaluation information evaluating a condition of the lawn.

* * * * *